Patented Oct. 15, 1935

2,017,125

UNITED STATES PATENT OFFICE 2,017,125

ZIRCONIUM, SILICON ALKALI ACID SOLUTION AND METHOD FOR STABILIZING SAME

Charles J. Kinzie, Niagara Falls, N. Y., assignor to The Titanium Alloy Manufacturing Company, New York, N. Y., a corporation of Maine No Drawing. Application July 27, 1932, Serial No. 625,214

22 Claims. (Cl. 23—250)

My invention relates to the preparation of zirconium solutions containing silicon and alkali or alkaline earth metals of the group consisting of barium, sodium and potassium and is especially aimed at improved methods for stabilizing such solutions when formed by adding thereto certain organic compounds.

In my pending application for patent filed October 23, 1931, Serial No. 570,767, Patent No. 1,916,226, July 4, 1933, I disclosed improved methods of converting the acid insoluble zircon into compounds readily soluble in dilute acids in amount considerably less than theoretically required to combine with zirconium to form the normal zirconium salt and with the alkali to form a normal alkali salt with the acid.

I have since discovered improved methods whereby these zirconium, silicon alkali or alkaline earth metal solutions may be stabilized or maintained in fluid condition for long periods, and more importantly my inventions permit of the production of much more concentrated acid solutions of zirconium, silicon alkali or alkaline earth metal combinations. The solutions resulting from my stabilizing methods may be used to advantage in mineralizing textiles of various kinds; the term "mineralizing" signifies the impregnation of silk, wool, cotton or other natural as well as synthetic textile and other like materials by inorganic compounds so as to increase the weight, or to act as mordants in dyeing operations, or again to render such material less susceptible to fire, etc.

I have discovered that the addition of suitable organic material, preferably an organic compound characterized as being readily water-soluble and containing carbon, hydrogen and oxygen, with fewer carbon atoms than hydrogen atoms, such as tartaric acid ($H_2C_4H_4O_6$) to the practically clear acid solution (chloride solution) as set forth in Example B of my pending application Serial No. 570,767, Patent No. 1,916,226, July 4, 1933, produces the novel effect of retarding or wholly eliminating the tendency of the silicon compounds in such solution to form a thick gelatinized mass, and in some cases the apparent solidification of the solution which should be maintained in fluid condition for the purposes I have mentioned. This Example B solution has approximately the following chemical composition:

| | Per cent. |
|---|---|
| Zirconium Oxide+traces of $TiO_2$ etc. ($ZrO_2+$) | 5.20 |
| Silica ($SiO_2$) | 2.40 |
| Sodium Oxide ($Na_2O$) | 3.60 |
| Chloride calculated as HCl (HCl) | 7.34 |
| Water ($H_2O$) | 81.46 |

It will be seen that the hydrochloric acid used is only moderately in excess of that theoretically required to form zirconium into normal chloride, but even so, the zirconium and soda have been brought into solution with the silicon also in solution.

I have experimented with various organic acids and compounds, but thus far have found that tartaric acid is preferable as the stabilizing agent among those in classification I have hereinbefore described. In practicing my improved methods I preferably take dilute acid soluble zirconium silicate compounds, for example, barium zirconium silicate preferably in the form of a wet milled suspension in water and dissolve this in mineral acid, such as hydrochloric acid or nitric acid, into which may be incorporated a suitable amount of tartaric acid, or this tartaric acid may be added after the solution of zirconium compound is made. The zircon ($ZrSiO_4$) may be decomposed with an alkaline earth metal, such as a barium compound, for example, barium carbonate ($BaCO_3$), and the resulting barium zirconium silicate dissolved in hydrochloric acid or nitric acid to produce a solution that may be stabilized by addition of tartaric acid that will maintain the barium and zirconium along with silicon in solution.

It will be found that the resultant mineral acid solution will have become completely stabilized and will remain fluid for indefinite periods.

Having in this general way indicated the nature of my discoveries, I will now set forth several detailed examples of how my improved methods may be practiced to advantage with various mineral acid and organic compounds whereby such resulting acid solutions containing zirconium, silicon and alkali or alkaline earth fluxes may be stabilized by adding suitable organic agents to the end that stable solutions may be produced for the various uses I have mentioned.

Example A 500 parts by weight of finely milled zircon ($ZrSiO_4$) were intimately mixed with 527½ parts by weight of barium carbonate and the charge was heated to temperature of about 1200–1300° C. which resulted in essentially complete decomposition of the zirconium silicate and forming barium zirconium silicate which is soluble in dilute acids. The roasted product is unfused and relatively soft after heating and is of the following approximate composition.

|  | Per cent |
|---|---|
| Zirconium (calculated as $ZrO_2$) | 35.71 |
| Silicon (calculated as $SiO_2$) | 18.68 |
| Barium (calculated as BaO) | 45.05 |
|  | 99.44 |

The balance consisting of impurities such as $Al_2O_3$, $TiO_2$, $Fe_2O_3$, etc. 200 parts by weight of the above product was wet-milled with 100 parts by weight of water to such fineness that all passed a 325 mesh sieve. Since the product is soft the milling is readily effected. Before discharging from the mill 100 parts by weight of water was added to form a slurry or suspension of water insoluble barium zirconium silicate.

In obtaining this solution the following will illustrate the method as well as a comparison between the untreated solution and that treated according to my invention relating to stabilizing effect of organic matter.

Example A¹ (solution untreated)

63.0 parts by weight of hydrochloric acid of 35.5% HCL content, is diluted with 40 parts by weight of water and the mix was heated to 95° C.; 100 parts by weight of barium zirconium silicate suspension was then added with the solution nearly complete in a few minutes. Then 64 parts by weight of water was added. This charge was digested at about 95° C. and after 20 minutes the solution had set to a solid gel.

Example A² (solution treated)

63.0 parts by weight of hydrochloric acid of 35.5% HCL content was diluted with 40 parts by weight of water and heated to 95° C.; 100 parts by weight of barium zirconium silicate suspension was stirred in and solution was as nearly complete shortly thereafter. There was now added 1 part by weight of tartaric acid in solution with 63 parts by weight of water.

The chloride solution of this treated example will be of approximately the following composition:

|  | Per cent |
|---|---|
| Zirconium (calculated as $ZrO_2$) | 6.0 |
| Silicon (calculated as $SiO_2$) | 3.0 |
| Barium (calculated as BaO) | 8 |
| Chlorides (calculated as HCl) | 8.4 |
| Carbon (C) | 0.12 |
| Water ($H_2O$) | 74.48 |
|  | 100.00 |

This resultant solution was digested 1 hour at 95° C. and remained quite fluid and after cooling at room temperature has continued to remain fluid.

Example B 2.024 parts by weight of tartaric acid crystals ($H_2C_4H_4O_6$) are dissolved in 86.00 parts by weight of hydrochloric acid of 35.5% HCl content. To this solution is added 100.00 parts by weight of a zirconium slurry made in the following manner:

A sodium zirconium silicate suspension in water is obtained by first wet milling sodium zirconium silicate with water to yield a suspension containing the following ingredients mainly suspended as water insoluble materials.

|  | Per cent |
|---|---|
| Zirconium (calculated as $ZrO_2$) | 20.65 |
| Silicon (calculated as $SiO_2$) | 10.49 |
| Sodium (calculated as $Na_2O$) | 14.06 |
| Water etc. | 54.80 |
|  | 100.00 |

The solution is rapid and becomes quite hot. However no thickening takes place and after standing for about 45 days, the solution was apparently just as fluid as when made because the tartaric acid had effectively prevented gelatization.

Zirconium silicon alkali chloride solution prepared as in this example upon analysis has shown the following composition.

|  | Per cent |
|---|---|
| Zirconium (calculated at $ZrO_2$) | 10.53 |
| Silicon (calculated as $SiO_2$) | 5.33 |
| Sodium (calculated as $Na_2O$) | 7.51 |
| Carbon (C) | 0.35 |
| Chlorides (calculated as HCl) | 16.24 |
| Water | 60.04 |
|  | 100.00 |

The above composition for this solution represents the result after settling out of small amount of insoluble matter: it is optional as to whether this insoluble matter is removed or not. For example, a user of this chloride solution might prefer to purchase the sodium zirconium silicate compound and then prepare the solution as required for use; for some purposes it would be permissible to use the solution with the small amount of insoluble matter present, while in other cases it may prove preferable to allow it to settle and remove the solution from the settled insoluble matter.

The chloride solution of this Example B, after standing about 22 days, had according to analysis the following composition:

|  | Per cent |
|---|---|
| Zirconium (calculated as $ZrO_2$) | 10.43 |
| Silicon (calculated as $SiO_2$) | 5.07 |
| Sodium (calculated as $Na_2O$) | 7.49 |
| Carbon (C) | 0.35 |
| Chlorides (calculated as HCl) | 16.24 |
| Water | 60.42 |
|  | 100.00 |

It will be seen from above that solution is stable for almost all practical purposes.

I have observed, however, that as time progresses there is a gradual accumulation of salt; for some purposes it may be desirable to prepare the solution in more dilute form and as an extreme example of this I present the following comparative Example C.

Example C 2.024 parts by weight of tartaric acid crystals are dissolved in 50 c. c. water, and 86 parts by weight of hydrochloric acid of 35.5% HCl content is diluted with 200 c. c. water. The diluent water may be heated so as to have the acid mix at about 65° C. To this dilute hydrochloric acid solution is added 100 parts by weight of the zirconium slurry of Example B and when solution has progressed to a point where all soluble matter is in solution there is added the solution of 2.024 parts by weight tartaric acid dissolved in 50 c. c. water.

After allowing the small amount of insoluble matter to settle, the essentially clear solution will have approximately the following composition:

|  | Per cent |
|---|---|
| Zirconium (calculated as $ZrO_2$) | 4.5 |
| Silicon (calculated as $SiO_2$) | 2.4 |
| Sodium (calculated as $Na_2O$) | 3.2 |
| Carbon (C) | 0.15 |
| Chlorides (calculated as HCl) | 7.00 |
| Water, etc. | 82.75 |
|  | 100.00 |

I have had chloride solutions prepared as per example C under observation for period of six months and find that there is no deposition of salt, the solution remaining fluid and essentially clear.

By way of comparison a solution prepared using the same proportions as in Example C, except that 52 c. c. water were added in place of solution of tartaric acid so as to have a solution of same concentration but without tartaric acid, was found gelatinized after four months.

Between the concentration of solutions as per examples B and C there is a wide range of permissible concentrations which could be prepared according to my methods, although I do not limit my improved methods within the range of these two examples. More dilute solutions can be made either directly or by dilution of stronger solutions.

In Examples B and C I chose hydrochloric acid as the solvent for the zirconium silicon alkali compound and stabilized the resultant solution by addition of tartaric acid. However, I am not limited to the use of the chloride solution and in the following examples I will show how other acids may be used as solvents.

*Example D*

68 parts by weight of 1.83 sp. gr. $H_2SO_4$ is mixed with 200 parts by weight of water and to the resultant warm solution is added 157.6 parts by weight of the zirconium slurry of Example B and upon completion of solution of soluble fraction there is added 3.2 parts by weight of tartaric acid in solution with 50 parts by weight of water.

The zirconium silicon sodium combination dissolved quickly leaving but a little insoluble matter. This charge was left overnight during which time the insoluble settled out leaving an essentially clear solution. About 20 c. c. of this clear solution was placed in a test tube and maintained at about 95° C. for six hours and there was no gelling of same.

The zirconium silicon alkali sulphate solution prepared according to Example D had a composition approximtely as follows:

|  | Per cent |
|---|---|
| Zirconium (calculated as $ZrO_2$) | 6.5 |
| Silicon (calculated as $SiO_2$) | 3.4 |
| Sodium (calculated as $Na_2O$) | 4.6 |
| Carbon (C) | 0.21 |
| Sulphates (calculated as $H_2SO_4$) | 13.20 |
| Water etc. | 72.09 |
|  | 100.00 |

The main part of the solution was left standing at room temperature and has remained fluid under observation for a long period. This proves that the addition of tartaric acid has served to stabilize a zirconium silicon alkali sulphate solution in much the same manner as in case of chloride solutions treated with tartaric acid, for in tests without the tartaric acid, such solutions set into a stiff gel in about 24 hours.

*Example E*

119.3 parts by weight of nitric acid (70% $HNO_3$) is diluted with 154 parts by weight of water and the solution is then preferably heated to about 65° C. 157.4 parts by weight of the zirconium slurry of Example B is now added and upon solution of soluble material there is added 3.2 parts by weight of tartaric acid dissolved in 50.0 parts by weight of water. The solution was rapid and only a small amount of insoluble matter remained.

After settling out of this small amount of insoluble matter, about 20 c. c. solution was heated in a test tube for about 6 hours at 95° C. and this solution remained fluid; the addition of tartaric acid has stabilized the solution and prevented the gelling of the silicon compounds, which would otherwise occur in an hour according to my tests.

The stabilized nitrate solution as produced in Example E was of approximate composition as follows:

|  | Per cent |
|---|---|
| Zirconium (calculated as $ZrO_2$) | 6.4 |
| Silicon (calculated as $SiO_2$) | 3.4 |
| Sodium (calculated as $Na_2O$) | 4.5 |
| Carbon (C) | 0.20 |
| Nitrates (calculated as $HNO_3$) | 17.20 |
| Water, etc. | 68.30 |
|  | 100.00 |

In the preceding examples I have shown how my invention may be practiced with sulphuric acid or with nitric acid.

As in case of chloride solutions I do not confine myself to the specific proportions of the examples or to the specific concentrations. More or less concentrated solutions may be made and the order of addition of one ingredient to another, temperature of solutions, etc. may be widely varied. It is optional also whether or not the small amount of insoluble residue remains in solution or not.

I have also found that citric acid may be used to stabilize these solutions containing zirconium, silicon and alkali or alkaline earth metal in acid, but more is required and therefore I prefer to use tartaric acid.

I have also found that sodium zirconium tartrate had an effect similar to tartaric acid and may be used instead of tartaric acid.

For example, about 3.3 parts by weight of sodium zirconium tartrate solution may be used to replace one part of tartaric acid in the examples given. Such sodium zirconium tartrate solution had approximately the following composition:

|  | Per cent |
|---|---|
| Zirconium (calculated as $ZrO_2$) | 9.10 |
| Carbon (C) | 9.71 |
| Sodium (calculated as $Na_2O$) | 7.07 |
| Water, etc. | 74.12 |
|  | 100.00 |

*Example F*

I have also found that sugar ($C_{12}H_{22}O_{11}$) may be used to stabilize the solution containing Zr, Si and alkali salts and will effectively retard or prevent gelatinization of solution. Sugar may for some purposes be objectionable because if the solution be heated for long period it tends to discolor.

68.5 parts by weight of 35.5% HCl are diluted with 66 parts by weight water and heated to about 60° C. 78.8 parts by weight of the zirconium slurry of Example B is added and stirred. The major or soluble portion dissolves readily and to this solution is added 1.24 parts by weight of sugar ($C_{12}H_{22}O_{11}$) dissolved in 25 parts by weight of water.

This charge is left to settle and a sample of essentially clear solution heated at 95° C. for 20 hours shows no evidence of gelling.

When the charge as in this example was made except that no sugar was used, a sample of solution obtained gelled to stiff mass within three hours.

In the foregoing examples I have shown methods of obtaining and stabilizing chloride, sulphate and nitrate solutions of zirconium silicon alkali or alkaline earth metal compounds of the group consisting of barium, sodium and potassium, using the zirconium compound as obtained by wet milling of the roasted mixture of $ZrSiO_4$ with alkali, without any attempt being made to remove such water dissolved salts as $Na_2CO_3$, small amounts of sodium silicate, sodium aluminate and traces of other impurities.

*Example G*

For certain purposes it may be desirable to produce solutions lower in alkali and also being purer due to removal of impurities referred to.

In order to accomplish this I washed out the water-dissolved material contained in the zirconium slurry, and upon drying the washed product a dry material is obtained having a composition as follows:

|  | Per cent |
|---|---|
| Zirconium (calculated as $ZrO_2$) | 52.42 |
| Silicon (calculated as $SiO_2$) | 25.08 |
| Sodium (calculated as $Na_2O$) | 21.75 |
|  | 99.25 |

176 parts by weight of 35.5% hydrochloric acid are diluted with 195 parts by weight of water and the mixture warmed to about 60° C. 100 parts by weight of this dry sodium zirconium silicate of above composition are stirred in, and the charge is then stirred to complete solution of soluble material. There is then added 5 parts by weight tartaric acid previously dissolved in 24 parts by weight of water.

This treatment produces a solution containing zirconium and silicon along with sodium which is less in proportion to zirconium and silicon than in the former examples. For example, the solution as prepared in this Example G will have the following approximate composition:

|  | Per cent |
|---|---|
| Zirconium (calculated as $ZrO_2$) | 10.00 |
| Silicon (calculated as $SiO_2$) | 5.00 |
| Sodium (calculated as $Na_2O$) | 4.35 |
| Carbon (C) | 0.32 |
| Chloride (calculated as HCl) | 12.30 |
| Water | 68.03 |
|  | 100.00 |

Solutions of this composition in respect to the proportion of zirconium, silicon and $Na_2O$ should remain stable and freer of salt deposits as compared with Example B, and stronger or weaker solutions may be made to suit the requirements.

In this example as in the use of the unwashed sodium zirconium silicate, I may make sulphate or nitrate solutions and stabilize these with tartaric acid, and in cases where it may be preferred to use alkali zirconium tartrate, or citric acid, or sugar as the stabilizing agent, these substances will work in much the same manner as in examples given for the sodium zirconium silicate slurry made according to Example B. These stabilizing agents are embraced in that group of organic compounds that are characterized as being very soluble in water, and contain carbon, hydrogen and oxygen, with fewer carbon atoms than hydrogen atoms.

In the foregoing examples I have referred to sodium zirconium silicate as produced by roasting finely milled zircon ($ZrSiO_4$) with sodium carbonate. Other sodium alkali may be used, but $Na_2CO_3$ is preferable. In any event only enough alkali should be used to easily decompose the zirconium silicon material in such manner as to leave both soluble in dilute acids along with alkali metal compound.

Although I have referred to and prefer zircon ($ZrSiO_4$) as the raw zirconium material, I wish it understood that other zirconium materials will serve.

Although I have referred to relatively pure zirconium products I wish it understood that less pure or crude zircon or zirconium-containing materials may be used within the scope of my invention.

*Example H*

As an example how my invention may be practiced starting with zirconium oxide, silica and alkali I may mix the following ingredients: 130 parts by weight zirconium oxide, 70 parts by weight silica, and 200 parts by weight sodium carbonate.

The $ZrO_2$ and $SiO_2$ should be of suitable fineness, preferably at least 99½% passing through 325 mesh and these two materials are well mixed with the sodium carbonate (commercial soda ash).

The charge is roasted at about 920° C. for a period sufficient to decompose the $ZrO_2$ and $SiO_2$ and cause these to combine wtih the soda ash to yield a product soluble in dilute acids yielding zirconium, silicon and sodium in solution.

The roasted product obtained in this charge of about 304.6 parts by weight is of the following approximate composition:

|  | Per cent |
|---|---|
| Zirconium (calculated as $ZrO_2$) | 43 |
| Silicon (calculated as $SiO_2$) | 23 |
| Sodium (calculated as $Na_2O$) | 34 |
|  | 100 |

This product may be dry-milled to suitable fineness and is then added dry to the acid to obtain a solution, or it may preferably be wet-milled and dissolved as follows:

The 304.6 parts by weight of this dry-milled product is charged to a ball mill along with 294 parts by weight of water, and the charge is milled to a point where less than ½ of 1% solids remain on 325 mesh sieve or to any fineness for convenient handling and easy solubility.

The small amount of water soluble material may be removed, or as in following part of this example the product may be dissolved direct. 86 parts by weight of hydrochloric acid containing 35.5% HCL and 2.024 parts by weight of tartaric acid crystals are added to the HCL and dissolved therein. 100 parts by weight of above mentioned zirconium slurry is added, and stirred until the soluble material is dissolved. The solution is rapid and charge becomes quite hot.

The solution will be found stable and may be used direct or the small amount of insoluble material present may be settled out.

The solution will have a composition approximating that of Example B.

If the tartaric acid were omitted the charge would gel in a short time, and would be of no value as a solution source of zirconium, silicon, etc.

As in the preceding examples other organic matter may be used in place of tartaric acid.

The compound may if desired, be converted to sulphate or nitrate solution, and then stabilized in same manner as in the sulphate and nitrate examples.

This Example H shows how zirconium oxide and silica may be used as raw material, and is important in showing how if natural $ZrO_2$ ores were used the silica could be added to bring the $ZrO_2:SiO_2$ ratio to about 65:35.

Example I

I have also practiced my invention on solutions obtained from potassium zirconium silicate. 1000 parts by weight finely milled zircon is mixed with 676 parts potassium carbonate and heated at about 1000° C. until the zircon is decomposed and rendered soluble in dilute acids.

The roasted product will be of the following approximate composition:

| | Per cent |
|---|---|
| Zirconium (calculated as $ZrO_2$) | 43.21 |
| Silicon (calculated as $SiO_2$) | 24.32 |
| Potassium (calculated as $K_2O$) | 31.05 |
| Balance carbon dioxide $CO_2$ | 1.42 |
| | 100.00 |

The product is preferably wet-milled to suitable fineness with an equal weight of water.

In obtaining my solution I may proceed as follows: 73.5 parts by weight hydrochloric acid (35.5% HCl content) are diluted with 62 parts by weight of water and warmed to about 70° C. and there is then added 100 parts by weight of this potassium zirconium silicate slurry.

The solution of soluble material is rapid and only a little insoluble matter remains. 2 parts by weight of tartaric acid were dissolved in 25 parts by weight of water and added to this acid solution.

This stabilized chloride solution had the following approximate composition:

| | Per cent |
|---|---|
| Zirconium (calculated as $ZrO_2$) | 8.0 |
| Silicon (calculated as $SiO_2$) | 4.6 |
| Potassium (calculated as $K_2O$) | 5.9 |
| Chlorides (calculated as HCl) | 10.0 |
| Carbon (C) | 0.25 |
| Water ($H_2O$) | 71.25 |
| | 100.00 |

A small amount of this solution was heated in test tube at 95° C. for ten hours remained fluid and did not gel.

The main part of the solution was left standing at room temperature and remained fluid as observed after about 72 hours and continued fluid for a long period of time thereafter.

I claim as my invention:—

1. A method of converting zirconium silicate or zircon into a stabilized acid zirconium solution containing silicon and an alkali metal, which comprises decomposing said zirconium silicate mixed with said alkali through heating, treating the roasted product with nitric acid to solution of silicon and soluble zirconium compounds, separating the clear acid liquor containing zirconium, silicon and alkali in solution, and adding a readily water-soluble organic compound selected from the group consisting of tartaric acid, citric acid, and sodium zirconium tartrate to stabilize same.

2. A method of converting zirconium silicate or zircon into a stabilized acid zirconium solution containing silicon and an alkali metal, which comprises decomposing said zirconium silicate mixed with said alkali through heating, treating the roasted product with sulphuric acid to solution of silicon and soluble zirconium compounds, separating the clear acid liquor containing zirconium, silicon and alkali in solution, and adding a readily water-soluble organic compound selected from the group consisting of tartaric acid, citric acid, and sodium zirconium tartrate to stabilize same.

3. In the method of forming a stabilized acid zirconium solution containing silicon and a barium compound, the steps which comprise treating an aqueous zirconium-silicon-barium solution with hydrochloric acid, and then mixing therewith a readily water-soluble organic compound selected from the group consisting of tartaric acid, citric acid, and sodium zirconium tartrate to stabilize same.

4. In the method of forming a stabilized acid zirconium solution containing silicon and a barium compound, the steps which comprise treating an aqueous zirconium-silicon-barium solution with nitric acid, and then mixing therewith a relatively water-soluble organic compound selected from the group consisting of tartaric acid, citric acid, and sodium zirconium tartrate to stabilize same.

5. A method of converting zirconium silicate or zircon into a stabilized acid solution containing soluble compounds of zirconium, silicon and of a metal selected from the group consisting of barium, sodium and potassium, which comprises heating said zirconium silicate mixed with an alkali compound of said metal to substantial complete decomposition, treating the roasted product with mineral acid to bring into solution soluble compounds of zirconium, silicon and said metal, separating therefrom the clear acid liquor, and adding to said liquor a readily water-soluble organic compound selected from the group consisting of tartaric acid, citric acid, and sodium zirconium tartrate to stabilize same.

6. A method of converting zirconium silicate or zircon into a stabilized acid solution containing soluble compounds of zirconium, silicon and of a metal selected from the group consisting of barium, sodium and potassium, which comprises heating said zirconium silicate mixed with an alkali compound of said metal to substantial complete decomposition, treating the roasted product with hydrochloric acid to bring into solution soluble compounds of zirconium, silicon and said metal, separating therefrom the clear acid liquor, and adding to said liquor a readily water-soluble organic compound selected from the group consisting of tartaric acid, citric acid, and sodium zirconium tartrate to stabilize same.

7. A method of converting zirconium silicate or zircon into a stabilized acid solution containing soluble compounds of zirconium, silicon and of a metal selected from the group consisting of barium, sodium and potassium, which comprises heating said zirconium silicate mixed with an alkali compound of said metal to substantial complete decomposition, treating the roasted product with mineral acid to bring into solution soluble compounds of zirconium, silicon and said metal, separating therefrom the clear acid liquor, and adding to said liquor tartaric acid to prevent gelatinization of the silicon compounds therein whereby such acid solution is stabilized.

8. In the production of a stabilized acid solution containing soluble compounds of zirconium, silicon and of a metal selected from the group consisting of barium, sodium and potassium, the steps which comprise treating an aqueous suspension containing decomposed compounds of zirconium, silicon and said metal with mineral acid, and then mixing therewith a readily water soluble organic compound selected from the group consisting of tartaric acid, citric acid, and sodium zirconium tartrate to stabilize same.

9. In the production of a stabilized acid solution containing soluble compounds of zirconium, silicon and barium, the steps which comprise treating an aqueous suspension containing decomposed compounds of zirconium, silicon and barium with mineral acid, and then mixing therewith a readily water soluble organic compound selected from the group consisting of tartaric acid, citric acid, and sodium zirconium tartrate to stabilize same.

10. In the production of a stabilized acid solution containing soluble compounds of zirconium, silicon and of a metal selected from the group consisting of barium, sodium and potassium, the steps which comprise treating an aqueous suspension containing decomposed compounds of zirconium, silicon and said metal with hydrochloric acid and then mixing therewith tartaric acid to prevent gelatinization of the silicon compounds whereby such acid solution is stabilized.

11. In the production of a stabilized acid solution containing soluble compounds of zirconium, silicon and of a metal selected from the group consisting of barium, sodium and potassium, the steps which comprise treating an aqueous suspension containing decomposed compounds of zirconium, silicon and said metal with hydrochloric acid and then mixing therewith a relatively small amount of tartaric acid to prevent gelatinization of the silicon compounds whereby such acid solution is stabilized.

12. In the production of a stabilized acid solution containing soluble compounds of zirconium, silicon and of a metal selected from the group consisting of barium, sodium and potassium, the steps which comprise treating an aqueous suspension containing decomposed compounds of zirconium, silicon and said metal with dilute hydrochloric acid and then mixing therewith sodium zirconium tartrate to prevent gelatinization of the silicon compounds whereby such acid solution is stabilized.

13. In the production of a stabilized acid solution containing soluble compounds of zirconium, silicon and of a metal selected from the group consisting of barium, sodium and potassium, the steps which comprise treating an aqueous suspension containing decomposed compounds of zirconium, silicon and said metal with hydrochloric acid and then mixing therewith a relatively small amount of sodium zirconium tartrate to prevent gelatinization of the silicon compounds whereby such acid solution is stabilized.

14. In the method of stabilizing a mineral acid zirconium solution containing soluble compounds of silicon and of a metal selected from the group consisting of barium, sodium and potassium, the step which consists in incorporating in said solution a readily water-soluble organic compound selected from the group consisting of tartaric acid, citric acid, and sodium zirconium tartrate.

15. In the method of stabilizing a mineral acid zirconium solution containing soluble compounds of silicon and of a metal selected from the group consisting of barium, sodium and potassium, the step which consists in incorporating in said solution tartaric acid.

16. As a new article, a stabilized acid zirconium solution containing soluble compounds of zirconium and silicon and also soluble salts of a metal of the group consisting of barium, sodium and potassium combined with not less than 0.10% of a water-soluble carbon compound derived from the group consisting of tartaric acid, citric acid and sodium zirconium tartrate.

17. As a new article, a stabilized chloride zirconium solution containing soluble compounds of zirconium and silicon and also soluble salts of a metal of the group consisting of barium, sodium and potassium combined with not less than 0.10% of a water-soluble carbon compound derived from the group consisting of tartaric acid, citric acid, and sodium zirconium tartrate.

18. As a new article, a stabilized nitrate zirconium solution containing soluble compounds of zirconium and silicon and also soluble salts of a metal of the group consisting of barium, sodium and potassium combined with not less than 0.10% of a water-soluble carbon compound derived from the group consisting of tartaric acid, citric acid, and sodium zirconium tartrate.

19. As a new article, a stabilized sulphate zirconium solution containing soluble compounds of zirconium and silicon and also soluble salts of a metal of the group consisting of sodium and potassium combined with not less than 0.10% of a water-soluble carbon compound derived from the group consisting of tartaric acid, citric acid, and sodium zirconium tartrate.

20. As a new article, a stabilized acid zirconium solution containing soluble compounds of zirconium and silicon and also soluble salts of barium combined with not less than 0.10% of a water-soluble carbon compound derived from the group consisting of tartaric acid, citric acid, and sodium zirconium tartrate.

21. As a new article, a stabilized chloride zirconium solution containing soluble compounds of zirconium and silicon and also soluble salts of sodium combined with not less than 0.10% of a water-soluble carbon compound derived from the group consisting of tartaric acid, citric acid, and sodium zirconium tartrate.

22. As a new article, a stabilized chloride zirconium solution containing soluble compounds of zirconium and silicon and also soluble salts of barium combined with not less than 0.10% of a water-soluble carbon compound derived from the group consisting of tartaric acid, citric acid, and sodium zirconium tartrate.

CHARLES J. KINZIE.